United States Patent
Guippe et al.

(10) Patent No.: US 6,581,643 B2
(45) Date of Patent: Jun. 24, 2003

(54) CHANNEL FOR AN AUTOMOBILE FLUID

(75) Inventors: Jérôme Guippe, Morancez (FR); Pierre Milhas, Vitry le Francois (FR)

(73) Assignee: Nobel Plastiques, Nanterre (FR)

( * ) Notice: Subject to any disclaimer, the term of this patent is extended or adjusted under 35 U.S.C. 154(b) by 0 days.

(21) Appl. No.: 10/148,447

(22) PCT Filed: Nov. 30, 2000

(86) PCT No.: PCT/FR00/03347

§ 371 (c)(1),
(2), (4) Date: May 30, 2002

(87) PCT Pub. No.: WO01/42005

PCT Pub. Date: Jun. 14, 2001

(65) Prior Publication Data

US 2002/0179170 A1 Dec. 5, 2002

(30) Foreign Application Priority Data

Dec. 9, 1999 (FR) .............................. 99 15533

(51) Int. Cl.$^7$ ............................... F16L 11/04
(52) U.S. Cl. ................... 138/137; 138/141; 138/140; 138/DIG. 7; 138/DIG. 1
(58) Field of Search ................... 138/137, 140, 138/141, DIG. 1, DIG. 7, 146

(56) References Cited

U.S. PATENT DOCUMENTS

| | | | |
|---|---|---|---|
| 4,905,735 A | * 3/1990 | Akiyoshi | 138/125 |
| 5,271,977 A | 12/1993 | Yoshikawa et al. | 428/35.9 |
| 5,362,530 A | 11/1994 | Kitami et al. | 428/36.2 |
| 5,476,121 A | 12/1995 | Yoshikawa et al. | 138/138 |
| 5,576,101 A | 11/1996 | Saitoh et al. | 428/332 |
| 5,588,468 A | * 12/1996 | Pfleger | 138/121 |
| 5,799,704 A | * 9/1998 | Andre | 138/137 |
| 5,850,855 A | * 12/1998 | Kerschbaumer et al. | 138/121 |
| 5,957,164 A | * 9/1999 | Campbell | 138/126 |
| 6,435,217 B1 | * 8/2002 | Bertero | 138/126 |

FOREIGN PATENT DOCUMENTS

| | | |
|---|---|---|
| EP | 0 999 395 A2 | 5/2000 |
| JP | 1294034 A | 11/1989 |

* cited by examiner

Primary Examiner—Patrick Brinson
(74) Attorney, Agent, or Firm—Birch, Stewart, Kolasch & Birch, LLP

(57) ABSTRACT

A transport tube for transporting a motor vehicle fluid, in particular a coolant, which tube comprises:

- an inner layer (1) made of vulcanized elastomer material;
- an outer layer (2) made of thermoplastic material that withstands the coolant chemically and that is impermeable thereto; and
- an intermediate bonding layer (3) made of a material that is compatible with the materials of the inner and outer layers.

10 Claims, 1 Drawing Sheet

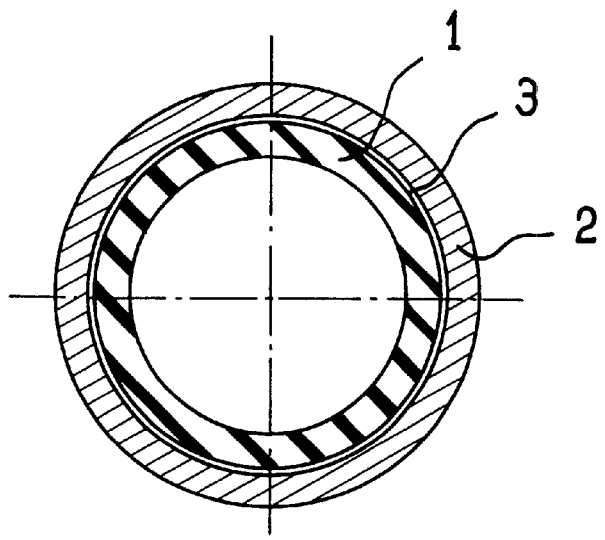
FIG_1
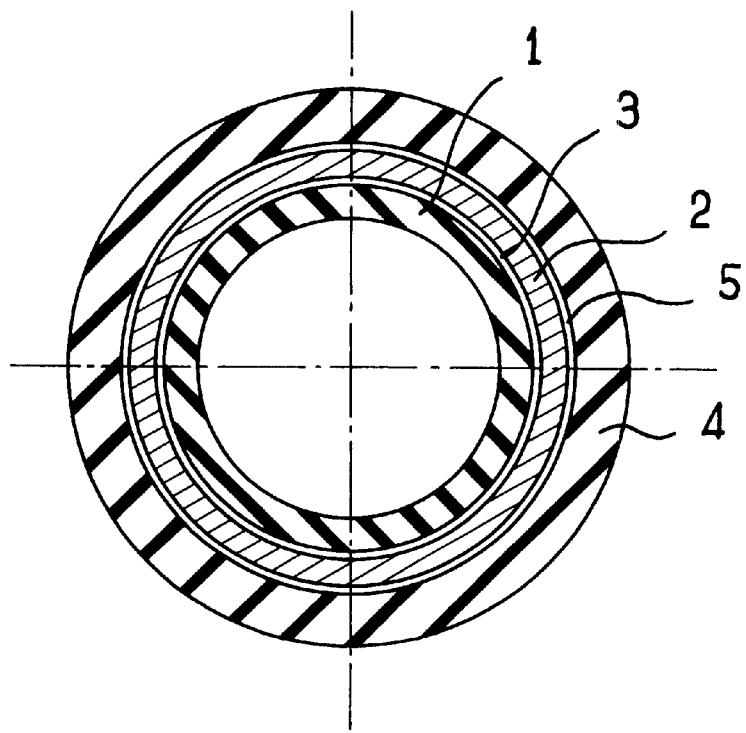
FIG_2

CHANNEL FOR AN AUTOMOBILE FLUID

This application is the national phase under 35 U.S.C. §371 of PCT International Application No. PCT/FR00/03347 which has an International filing date of Nov. 30, 2000, which designated the United States of America.

The present invention relates to a tube or a duct for transporting a motor vehicle fluid and in particular a coolant in an internal combustion engine, for example.

BACKGROUND OF THE INVENTION

Currently known prior art comprises:

rubber (ethylene-propylene diene monomer or "EPDM") tubes which may optionally be reinforced depending on the pressure levels and/or the temperatures of the fluids which flow therein;

metal tubes that are lined with and associated with rubber (EPDM) ducts enabling the movements and the vibrations generated by the engine to be absorbed; the rubber tubes are used in particular for making the connections to members such as the engine, the radiator, the expansion tank . . . . The drawback of those systems lies in the significant size of the pipework given the existence of the metal tubes, in the relatively high rigidity of the system, and in the problems of the metal tubes corroding despite the lining applied thereto;

single layer pipes made of rigid thermoplastic such as polyamide (in particular PA 66) filled with glass fiber; these pipes are very rigid and consequently have the drawback of transmitting vibration, and of giving off noise as a result of the vibration and also as a result of the flow of fluid passing therealong;

thermoplastic pipes having various rigid and flexible segments for absorbing vibration and movements generated by the engine; however, the flexible portions must be reinforced by a structure which limits both their radial expansion and their axial lengthening; the flexible portions are either made integrally with the rigid portions, or independently of said rigid portions and are assembled thereto by welding. The drawback of that technique essentially lies in its complexity and in the large number of manufacturing operations; and multilayer pipes made of synthetic material that is either entirely thermoplastic, or thermoplastic only in part, in which case the thermoplastic portion forms the inner layer of the pipe; the drawback of such a pipe lies in it being difficult, if not impossible, to connect to current rigid endpieces (e.g. a spigot), thus making it necessary to use an intermediate connection piece.

OBJECTS AND SUMMARY OF THE INVENTION

To mitigate the drawbacks of the prior art, the invention proposes a tube structure for transporting a fluid flowing in motor vehicle engines, and in particular a coolant, which tube structure also satisfies particularly strict specifications, and does so under good economic production conditions. It is necessary for this type of tube to be manufactured in simple manner and therefore at low cost, for it to continue to have some rigidity enabling it, in particular, to retain the shapes imposed on it prior to its final assembly, for it to present very high performance with regard to permeability, and in particular, much higher performance than that of the rubber ducts used until now, and finally, for said multilayer structure to be capable of withstanding assembly forces of the force-fit type without the various layers making it up separating under the effect of said forces.

Thus to this end, the invention provides a tube for transporting a motor vehicle fluid such as a coolant, which tube comprises:

an inner layer made of vulcanized elastomer material;

an outer layer made of thermoplastic material that withstands the coolant chemically and that is impermeable thereto; and an intermediate bonding layer made of a material that is compatible with the materials of the inner and outer layers.

In addition to satisfying the above-mentioned specifications, such a structure enables tubes to be made that are adapted to the mechanical performance that is required of them. Thus, the inner layer made of vulcanized elastomer material has a thickness that is adapted, for example, to the dimensions of the projection on the rigid endpieces onto which the tube is to be force fitted. In addition, the thickness of the outer layer made of thermoplastic is chosen as a function of the stiffness desired for the tube, which stiffness is compatible with the levels of movement and of vibration allowed when the tube is installed in the vehicle. The thickness of the intermediate layer itself lies in the range $1/10^{th}$ to $3/10^{ths}$ of a millimeter, said layer not having any mechanical function, but merely the function of interconnecting the two layers which surround it.

In an embodiment of the tube of the invention, the vulcanized elastomer of the inner layer is chosen from the components EPDM (polyolefin elastomer), nitrile polyvinyl chloride (PVC), and chlorosulfonated polyethylene (CSM).

The outer layer is chosen from the polyamides such as PA6, PA66, PA12. The outer polyamide can advantageously be filled with glass fiber.

Finally, the intermediate bonding layer is a substance based on ethylene, acrylic ester, and maleic anhydride.

In a second variant embodiment of the tube of the invention, the above-mentioned base structure, namely an elastomer layer, a thermoplastic layer, and a bonding layer, is covered by a vulcanized elastomer layer connected to the thermoplastic layer of the polyamide type via an intermediate bonding layer of the type described above.

The advantage of the coating lies mainly in the fact that the tube presents a flexible coating to the outside atmosphere, thereby damping noise and impacts and, by its vulcanized elastomer nature, possesses a structure that is cross-linked in three dimensions, thereby having the advantage of presenting quite good resistance to fire due to the fact that said structure does not collapse on itself under the effect of heat.

BRIEF DESCRIPTION OF THE DRAWING

Other characteristics and advantages of the invention will appear on reading the following description, given by way of example and with reference to the accompanying drawing, in which:

FIG. 1 is a diagrammatic cross-section view of a tube constituting a first embodiment of the invention; and FIG. 2 is a diagrammatic cross-section view of a second embodiment of a tube of the invention.

MORE DETAILED DESCRIPTION

In the embodiment shown in the figures, the tube of the invention is designed to form part of the engine cooling circuit and it comprises an inner layer 1 made of a vulcanized elastomer material of thickness constituting about 50% to 80% of the total thickness of the tube. Examples of materials that are suitable for making the inner layer are as follows: ethylene propylene rubbers (ethylene propylene monomers or "EPMs" and EPDMs), nitrile butadiene rubbers (NBRs), acrylic ester copolymers (ACMs), NBR/PVCs, hydrogenated nitrile butadiene rubbers (HNBRs), acrylic ester ethylene copolymers (AEMs), silicone rubbers (MVQs), fluoroelastomers (FPMs), methyl fluoro silicone rubbers (FMQs), isobutene-isoprene rubbers (IIRs), isoprene rubbers (IRs), styrene butadiene rubbers (SBRs), epichlorhydrine co-ethylene oxides (EO-ECOs), chloroprene rubbers (CRs), chlorosulfonated polyethylenes (CSMs), chlorinated polyethylenes (CPEs) . . . . This layer made of elastomer material has two main functions, i.e. firstly to enable significant deformation while maintaining tight contact with rigid endpieces of the nipple or spigot type when a tube of the invention is connected to a member provided with such an endpiece, and secondly to constitute a damper of the vibration to which the tube of the invention can be subject, which vibration can originate externally or internally, such as water hammer or other sudden variations in the flow of liquid transported by the tube.

The outer layer 2 of the tube of the invention is a polyamide layer, said polyamide layer being made of polyamide 12, or preferably being made of polyamide 66 or polyamide 6, both of which may optionally be filled with glass fiber depending on the mechanical performance desired for the tube. A thermoplastic material could also be chosen that meets characteristics which satisfy "class C" compliance criteria relating to all motor vehicle fluids in trials standardized by motor vehicle manufacturers. The thickness of the outer layer constitutes approximately the remainder to 100% of the total thickness beyond the thickness of the inner layer. The difference existing between the total thickness and the sum of said two thicknesses is reserved for the intermediate bonding layer 3 (of 1 to $3/10^{ths}$ of a mm), said intermediate layer being made of a material that is compatible with the materials of both layers 1 and 2, and in particular being a substance based on ethylene, acrylic ester, and maleic anhydride, and is available on the market under the tradename LOTADER, for example.

Such a substance is easy to fabricate since it can be coextruded with each of the layers.

In a variant embodiment shown in FIG. 2, the base structure of FIG. 1 is covered by another layer 4 which is constituted by a vulcanized elastomer material of the same type as that identified for layer 1, said layer 4 being connected to layer 2 via a bonding layer 5 of the same type as layer 3 described above. This type of flexible covering imparts several qualities to the tube made in this way. Firstly, it is agreeable to touch, which corresponds to a desire of motor vehicle manufactures. Secondly, the flexible layer constitutes an anti-noise element in that it damps the impacts and vibration to which the tube is subjected from the outside. Thirdly, a vulcanized elastomer structure presents three-dimensional cross-linking which constitutes a factor in improving the ability of the pipe to resist fire, since said structure does not tend to collapse on itself under heat as a result of said three-dimensional cross-linking.

Naturally, an advantage of the tube of the invention is that it can be thermoformed by means of its layer 2 made of thermoformable thermoplastic. In addition, the inner layer made of elastomer material constitutes, for the thermoplastic at the moment of thermoforming, a sort of support for the polyamide layer which prevents the tube from kinking. Finally, it should be noted that the heat applied to the assembly at the moment of thermoforming contributes to vulcanizing the inner layer and/or the outer layer.

The pipe of the invention is suitable for many motor vehicle fluids (brake or power steering fluids, . . . ).

What is claimed is:

1. A tube for transporting a motor vehicle fluid, in particular a coolant, wherein said tube consists of:
   an inner layer (1) made of vulcanized elastomer material;
   an outer layer (2) made of thermoplastic material that withstands the coolant chemically and that is impermeable thereto; and
   an intermediate bonding layer (3) made of a material that is compatible with the materials of the inner and outer layers.

2. The tube according to claim 1, wherein the vulcanized elastomer of the inner layer is chosen from the components EPDM (polyolefin elastomer), nitrile polyvinyl chloride (PVC), and chlorosulfonated polyethylene (CSM).

3. The tube according to claim 2, wherein the outer layer is chosen from the polyamides PA6, PA66, PA12.

4. The tube according to claim 3, wherein the outer polyamide is filled with glass fiber.

5. The tube according to claim 1, wherein the bonding layer is a substance based on ethylene, acrylic ester, and maleic anhydride.

6. A tube for transporting a motor vehicle fluid, wherein said tube consists of:
   an inner layer (1) made of vulcanized elastomer material;
   an outer layer (2) made of thermoplastic material that withstands the coolant chemically and that is impermeable thereto;
   an intermediate bonding layer (3) made of a material that is compatible with the materials of the inner and outer layers; and
   a coating layer (4) made of vulcanized elastomer material covering the layer (2) made of thermoplastic material, and bonded to said layer (2) via an intermediate bonding layer (5) made of a material that is compatible with the coating layer (4) and the layer (2) made of thermoplastic material.

7. The tube according to claim 6, wherein the vulcanized elastomer of the inner layer is chosen from the components EPDM (polyolefin elastomer), nitrile polyvinyl chloride (PVC), and chlorosulfonated polyethylene (CSM).

8. The tube according to claim 7, wherein the outer layer is chosen from the polyamides PA6, PA66, PA12.

9. The tube according to claim 8, wherein the outer polyamide is filled with glass fiber.

10. The tube according to claim 6, wherein the bonding layer is a substance based on ethylene, acrylic ester, and maleic anhydride.

* * * * *